United States Patent [19]
Elie et al.

[11] Patent Number: 5,974,856
[45] Date of Patent: *Nov. 2, 1999

[54] METHOD FOR ALLOWING RAPID EVALUATION OF CHASSIS ELASTOMERIC DEVICES IN MOTOR VEHICLES

[75] Inventors: Larry Dean Elie, Ypsilanti; John Matthew Ginder, Plymouth; Joseph Steven Mark, Dearborn; Mark Edward Nichols, Saline; William Mcmurray Stewart, Livonia, all of Mich.

[73] Assignee: Ford Global Technologies, Inc., Dearborn, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/863,795
[22] Filed: May 27, 1997
[51] Int. Cl.$^6$ ..................................................... B60G 11/26
[52] U.S. Cl. ..................... 73/11.04; 267/276; 267/140.14
[58] Field of Search ............................... 73/11.04, 11.07; 267/140.14, 140.15, 201, 257, 258, 276, 279, 280, 292; 280/5.515, 5.516, 124.177

[56] References Cited

U.S. PATENT DOCUMENTS

| | | |
|---|---|---|
| 4,558,077 | 12/1985 | Gray . |
| 4,687,223 | 8/1987 | Miyoshi et al. . |
| 4,858,899 | 8/1989 | Saotome et al. . |
| 4,869,476 | 9/1989 | Shtarkman . |
| 5,051,200 | 9/1991 | Srail et al. . |
| 5,173,206 | 12/1992 | Dickens, Jr. et al. . |

(List continued on next page.)

FOREIGN PATENT DOCUMENTS

| | | |
|---|---|---|
| 0-298-266 | 1/1989 | European Pat. Off. . |
| 2-579-283 | 9/1986 | France . |
| 39-12-058 A1 | 10/1990 | Germany . |
| 2-003-722 | 1/1990 | Japan . |
| 3-249-440 | 11/1991 | Japan . |
| 4-107334 | 4/1992 | Japan . |
| 4-197811 | 7/1992 | Japan . |
| 1-259-802 | 1/1972 | United Kingdom . |

OTHER PUBLICATIONS

Research for New Vibration Isolation Techniques: From Hydro Mounts to Active Mounts, Andre' Genneseaux, 931324, pp. 491–499, May 10, 1993.

An Actively Damped Passenger Car Suspension System with Low Voltage Electro–Rheological Magnetic Fluid, Pinkos, Shtarkman and Fitzgerald, 930268, pp. 87–93 Mar. 1, 1995.

New Z–direction anisotropically conductive composites, Jin, Sherwood, Mottine, Tiefel and Opila, pp. 6008–6010 Nov. 15, 1988.

Optically Transparent, Electrically Conductive Composite Medium, Jin, Tiefel, Wolfe, Sherwood & Mottine, Jr., pp. 446–448 Jan. 24, 1992.

Japan Patent Laid–Open Publication Bulletin A, Tokkai Hei4–266970, pp. 1–9 Sep. 22, 1992.

A Model of the Behaviour of Magnetorheological Materials, Mark R. Jolly, J. David Carlson and Beth C. Munoz, pp. 607–614 Jul. 19, 1996.

*Primary Examiner*—Eric S. McCall
*Attorney, Agent, or Firm*—Gregory P. Brown

[57] ABSTRACT

A method allows the rapid evaluation of physical properties of chassis elastomeric devices in a motor vehicle. A parametric controller (26) provides a parametric state signal to a elastomer control module (24), which in turn generates an appropriate electrical current signal which is communicated to a variable elastomeric device (22) which includes a magnetorheological elastomer having iron particles embedded therein and a coil operatively associated therewith. When the coil is energized by electrical current signal provided from the elastomer control module (24), a magnetic field is generated which provides predetermined variability in the physical properties of the elastomeric device (22), allowing the rapid evaluation of vehicle performance for given physical properties of the elastomeric device (22).

2 Claims, 2 Drawing Sheets

U.S. PATENT DOCUMENTS

| | | |
|---|---|---|
| 5,276,623 | 1/1994 | Wolfe . |
| 5,277,281 | 1/1994 | Carlson et al. . |
| 5,337,865 | 8/1994 | Kasahara et al. . |
| 5,354,488 | 10/1994 | Shtarkman et al. . |
| 5,366,211 | 11/1994 | Hamada et al. . |
| 5,382,373 | 1/1995 | Carlson et al. . |
| 5,390,121 | 2/1995 | Wolfe . |
| 5,396,973 | 3/1995 | Schwemmer et al. . |
| 5,492,312 | 2/1996 | Carlson . |
| 5,547,049 | 8/1996 | Weiss et al. . |
| 5,609,353 | 3/1997 | Watson ................................... 280/707 |

METHOD FOR ALLOWING RAPID EVALUATION OF CHASSIS ELASTOMERIC DEVICES IN MOTOR VEHICLES

BACKGROUND OF THE INVENTION

1. Field of the Invention

This application is related to co-pending U.S. Ser. No. 08/585,026 entitled "Variable Stiffness Bushing Using Magnetorheological Elastomers" filed Jan. 11, 1996, and incorporated herein by reference, co-pending U.S. Ser. No. 08/585,069 entitled "Method and Apparatus for Varying the Stiffness of a Suspension Bushing" filed Jan. 11, 1996, and co-pending U.S. Ser. No. 08/681,424 entitled "Method and Apparatus for Reducing Brake Shudder" filed Jul. 23, 1996. This invention relates to a method for evaluating chassis elastomeric devices used in motor vehicles. More particularly, the method are useful for rapidly evaluating different physical properties of chassis elastomer devices by using magnetorheological elastomers to rapidly change the physical properties of the subject elastomeric device during evaluation.

2. Disclosure Information

Vehicle ride and handling performance are strongly influenced by the operative characteristics of the various bushings utilized within the automotive vehicle suspension system. Changes in the spring rate, or stiffness, dampness values of a particular bushing can directly influence a variety of operating characteristics, such as vehicle understeer, oversteer, squat and dive characteristics, as well as chassis noise, vibration, and vehicle ride harshness.

For instance, it has been observed that varying the stiffness of suspension bushings on a driven axle can significantly improve the ride and shift quality as perceived by an operator. Similarly, softening control arm inner bushings can improve noise, vibration and harshness qualities while possibly negatively impacting the vehicle's handling and dynamics capabilities. Generally speaking, optimal ride quality demands a suspension bushing having a relatively low spring rate. This permits the suspension to absorb disturbances in the roadway, such as tar strips, chuck holes, etc., without transmitting jarring vibrations to the occupants of the vehicle. On the other hand, optimal handling and dynamics characteristics, including braking demands a bushing having a relatively high stiffness. The "correct" bushing represents acceptable performance in all of the vehicle performance attributes established for the particular car. Finding the "correct" bushing is accomplished through a time consuming and costly process of trial and error.

For instance, in connection with the set-up and calibration of automotive vehicle suspension systems, the spring rates of the bushings are determined through this lengthy trial and error process. Generally, this includes fabricating bushings possessing what are believed to be the correct physical characteristics. The suspension is disassembled and the bushings are installed. The vehicle is evaluated and directional changes are made based on the performance of these bushings in the vehicle. The next iteration bushings are installed, and if all is well, they work. In fact, what often happens is the one set of bushings solves one issue, but creates a new issue somewhere else in the system. These "system" interactions can force the process through several time consuming and costly iterations, changing many of the elastomeric devices on the vehicle several times.

It would be desirable to overcome the aforenoted difficulties with tuning elastomeric devices for use in motor vehicles by providing a method for rapidly evaluating the physical properties of chassis elastomeric devices.

SUMMARY OF THE INVENTION

A method for allowing rapid evaluation of physical properties of chassis elastomeric devices used in motor vehicles has been discovered. Advantageously, this allows for improved customer satisfaction by enabling more optimal refinement in elastomer tuning, which increases vehicle performance in ride, handling, noise, vibration and harshness characteristics. The present invention allows rapid evaluation of a large number of physical property permutations versus fabricating numerous prototype elastomeric devices for evaluation. The time and costs associated through the avoidance of developing and fabricating many prototype elastomeric devices is significant.

In accordance with the present invention, a method for rapidly evaluating variations of chassis elastomeric devices used in motor vehicles comprises the steps of: providing a magnetorheological elastomer; receiving an operator input signal and generating a parametric state signal therefrom; communicating the parametric state signal from a parametric controller to an elastomer control module; generating an electrical current in response to the parametric state signal; and communicating the electrical current to an electrical coil operatively associated with the magnetorheological elastomer, thereby generating a magnetic field so as to control stiffness of the magnetorheological elastomer, allowing rapid evaluation of ride, handling, noise, vibration and harshness resulting from the parametric state signal.

It is an advantage of the present invention to provide a method allowing the rapid evaluation of various elastomeric devices possessing various physical properties to speed the development process and reduce costs associated with manufacturing prototype elastomeric devices having various physical properties.

DETAILED DESCRIPTION OF THE PREFERRED EMBODIMENT

Figure 1:
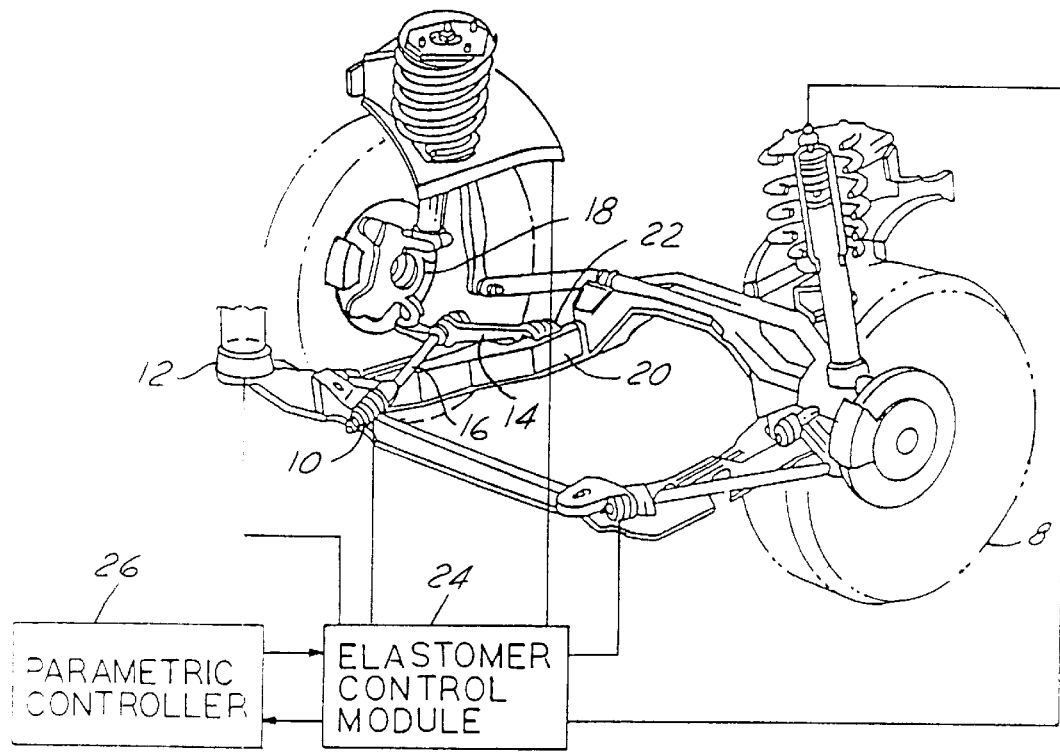
FIG. 1 is a perspective drawing of a front suspension for a motor vehicle including a several elastomeric devices which could be rapidly evaluated according to the present invention.

As shown in FIG. 1, a method according to the present invention is intended for use in developing motor vehicles having elastomeric bushings 10 and isolators 12. Such vehicles include suspensions, one example of which will now be described. The suspension includes a substantially transverse suspension member 14 and a longitudinal suspension member 16, which together form a lower control arm assembly interconnecting a wheel support member 18 to a chassis member 20. The longitudinal suspension member 16 is oriented somewhat parallel to a longitudinal axis of the motor vehicle, which generally coincides with the center line of the vehicle from front to rear. The chassis member 20 may take the form of a subframe structure mounted on a unibody, as shown, or it may simply be a component of the unibody structure. Alternatively, chassis member 20 could also be a portion of the frame of a vehicle having a body on frame style structure.

Each of the elastomeric joints, including bushings and isolators, incorporates key physical properties established to provide optimal vehicle performance. To determine the desired physical properties, elastomers having variable physical properties may be advantageously substituted therefore to allow rapid evaluation and ultimate determination of the optimum physical properties for the vehicle system. An elastomer control module 24 is provided which receives inputs from a parametric controller 26. Together, these allow an operator to variably control the physical properties of elastomeric devices. For instance, a variable elastomer in the form of a suspension bushing 22 may be interposed between the chassis member 20 and the transverse suspension member 14.

It should be understood that the present invention could be configured for determining the key physical properties of any elastomeric joint in the vehicle, including, but not limited to, suspension bushings, subframe isomounts, engine mounts, transmission mounts, exhaust system isolators, etc. Additionally, while a single device will be described, it should be noted that the present invention may be used to evaluate multiple elastomeric devices simultaneously to optimize their physical properties to deliver overall optimized system performance as well as individual performance. This is an important consideration due to the fact that a change in one elastomeric device generally changes the load function at other elastomeric devices, thus potentially impacting system performance. The ability to rapidly adjust and reevaluate all of the relevant elastomeric devices represents enormous cost reduction and time savings.

Figure 2:
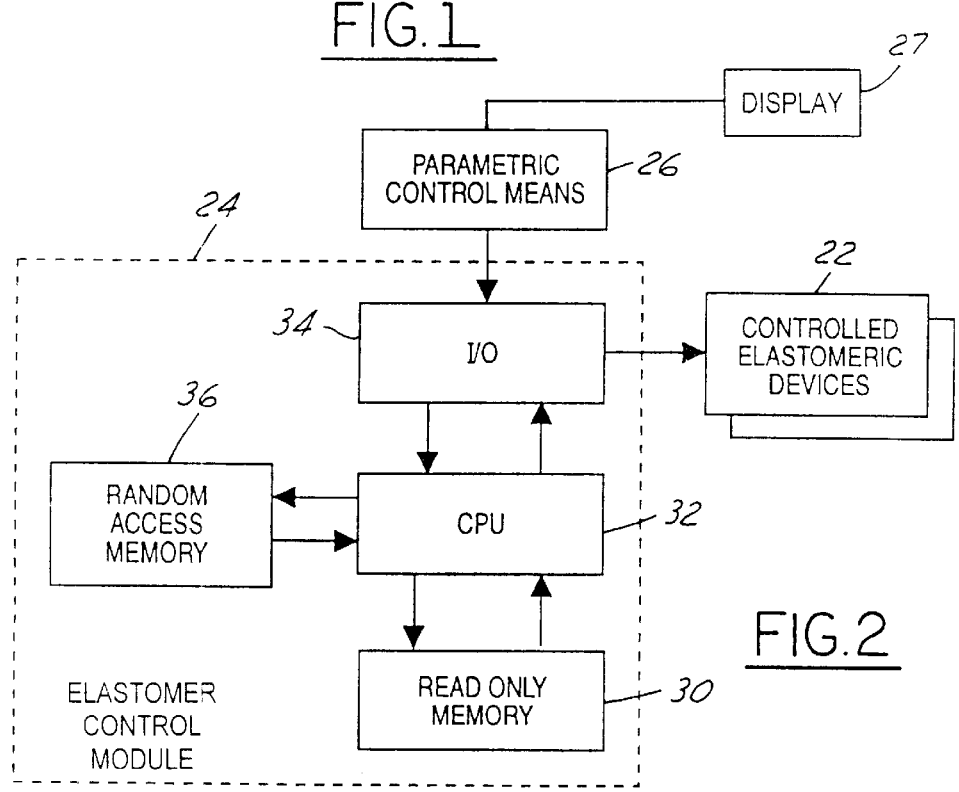
FIG. 2 is an overall system block diagram assembled in accordance with the present invention.

Referring now to FIG. 2, a elastomer control module 24 for controlling the variable suspension bushing 22 will now be described. Those skilled in the art will appreciate in view of this disclosure that the processor within the elastomer control module 24 and its associated peripheral equipment could be structured according to several different architectures. In a preferred embodiment, however, the processor is configured so that a control program is sequentially read for each unit command from a read-only memory (ROM) 30 which stores preset control programs. Unit commands are executed by a central processing unit (CPU) 32. The processor integrally includes an input-output circuit (I/O) 34 for exchanging data with external devices and a random access memory (RAM) 36 for temporarily holding data while the data are being processed.

Figure 3:
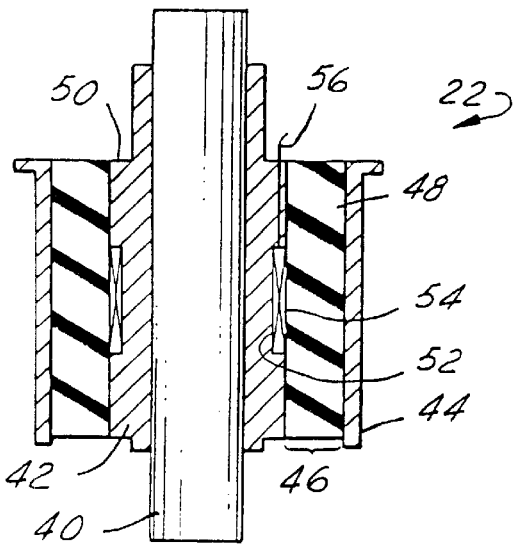
FIG. 3 is a schematic, cross-sectional view of a magnetorheological (MR) elastomer suspension bushing constructed in accordance with the principles of the invention.

Referring now to FIG. 3, suspension bushing 22 incorporating a magnetorheological (MR) elastomer is schematically illustrated and will be described in greater detail. It should be understood that the principles being described apply to any of the aforenoted elastomeric joints for which it is desired to obtain the benefit of the present invention. The suspension bushing 22 includes a central shaft or rod component which may comprise a shaft or bolt member 40 which is fixedly connected to the chassis member 20 through a pair of apertures disposed in a pair of mounting flanges. A first, radially inner, annular cylinder 42, which may be fabricated from a suitable low-carbon steel, is disposed about the shaft or bolt member 40 and is fixedly attached thereto by suitable fastening means. A second, radially outer, annular cylinder 44, which may also be fabricated from a suitable low-carbon steel, is disposed about the first, radially inner cylinder 42 such that an annular space 46 is defined therebetween. The second, radially outer cylinder 44 is adapted to be connected to the chassis member 16. The annular space 46 is filled with a magnetorheological (MR) elastomer 48 fabricated so as to achieve the desired physical properties of the variable suspension bushing 22. It should be readily apparent that the suspension bushing described herein is merely an example of a suspension bushing that has been adapted for use in accordance with the present invention.

The magnetorheological (MR) elastomer 48 of the present invention may comprise a suitable elastomer of natural rubber, silicone, polybutadiene, polyethylene, polyisoprene, or the like. The elastomer has particulate materials embedded therein, with a preference for particulates that are magnetizable by application of a magnetic field. These include particulates having paramagnetic, ferrimagnetic, or ferromagnetic properties. Examples of preferred paramagnetic particulates include compounds comprising oxides, chlorides, sulfates, sulfides, hydrates, and other organic or inorganic compounds of cerium, chromium, cobalt, dysprosium, erbium, europium, gadolinium, holmium, iron, manganese, neodymium, nickel, praesodymium, samarium, terbium, titanium, uranium, vanadium, and yttrium. Preferred paramagnetic elements and alloys include gadolinium, various stainless steels, and other alloys of iron, nickel, manganese, and cobalt, with or without other non-magnetic elements. Preferred ferrimagnetic particulates include magnetite ($Fe_3O_4$) and other compounds of iron and oxygen, and a third metallic component. Preferred ferromagnetic materials include iron, nickel, and cobalt, as well as alloys of these and other materials.

The size of the magnetizable particles embedded within the elastomer 20 can vary widely, such as, for example, from 10 nanometers to several millimeters. The embedding host material for the particulates can be any substantially non-magnetic viscoelastic solid material, examples of which have been set forth hereinbefore, and the preferred materials would include those comprising either a liquid or a solid precursor that can be substantially uniformly mixed with the magnetizable particles, and subsequently processed into its final solid form through means of various thermal, chemical, optical, electrical, or other treatments or processes. More specifically, a solid precursor comprising an uncured natural rubber mixture is preferred as the embedding host material due to the advantageous operative and processing characteristics of natural rubber, such as, for example, its handling capabilities, temperature resistance properties, and durability.

Referring again to FIG. 3, the outer peripheral surface 50 of the first, radially inner, annular cylinder 42 is provided with an annular recess 52 within which an annular electromagnetic wire coil 54 is disposed. In particular, the coil 54 comprises three hundred ten (310) turns of a twenty two (22) gauge copper wire having high temperature polymeric insulation. Wire leads 56 extend from the coil 54 to a driver or power supply which is operatively connected to a suitable source of electrical power, such as a vehicle battery or a supplemental power source when evaluating multiple elastomeric devices simultaneously. While not necessary, it is an advantage of the present invention that this coil 54 may be utilized both in connection with the actual initial fabrication or construction of the suspension bushing 22 in its finalized form or state, as well as for supplemental energization of the finalized suspension bushing 22 during actual operative use in the automotive vehicle during testing.

More particularly, the initial fabrication of the suspension bushing 22 involves coating the metal to rubber interfaces with a bonding agent to enhance adhesion therebetween. A suitable magnetorheological (MR) elastomer is then deposited within the annular space 46 defined between the first, radially inner cylinder 42 and the second, radially outer cylinder 44. The elastomer 48 is then cured at a temperature of approximately 150° C., and for a time period of between ten (10) and thirty (30) minutes, during which time a current of approximately three (3) amps is supplied to the coil 54 in order to generate a requisite magnetic field to align the particulates.

Specifically, in the preferred embodiment, the magnetic field and lines of flux extend upwardly within the inner cylinder 42, across the top of the elastomer 48, downwardly within the outer cylinder 44, and across the bottom of the elastomer 48 so as to complete the magnetic circuit. The particulates embedded within the elastomer are therefore aligned into head-to-tail arrangements comprising chains which subsequently determine the stiffness and shear modulus properties of the suspension bushing 18 both when a predetermined electrical current is applied to the coil 54 and when current is not applied to the coil 54. It is contemplated, however, that to provide variability of the desired physical property for a given elastomeric device, the orientation of the magnetic field during fabrication and operation could take many different forms.

The elastomer control module 24 produces variable stiffness and modulus values of the bushing 22 by varying the electrical current applied to the coil 54 through leads 56, thereby varying the flux density of the generated magnetic field. The elastomer control module 24 may employ commonly known pulse width or pulse-frequency modulation schemes to supply the appropriate electrical current signal in response to the parametric state signal generated by the parametric controller 26.

Figure 4:
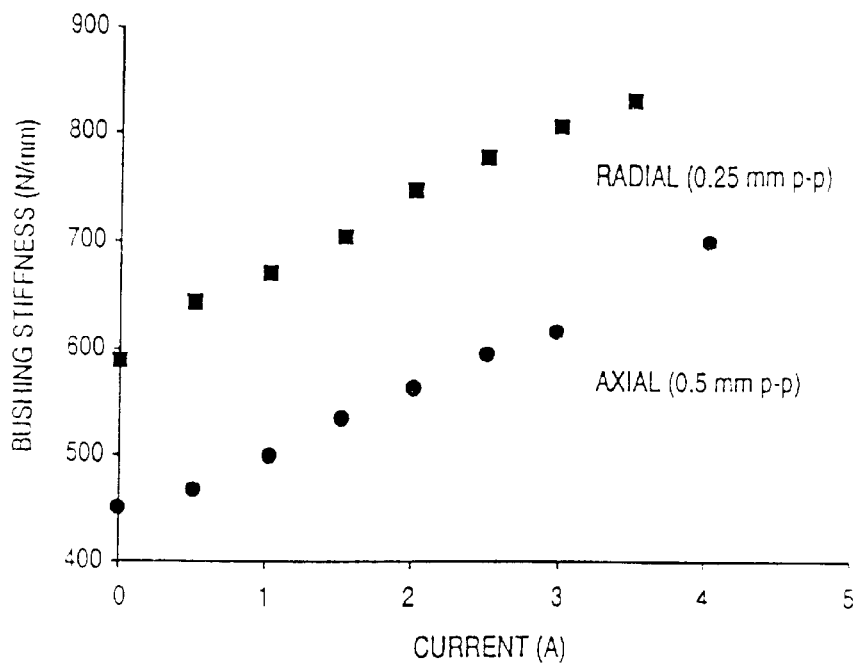
FIG. 4 is a graphical plot illustrating the bushing stiffness as a function of the applied electrical current.

Referring now to FIG. 4, the variability of a suspension bushing 22 constructed according to the principles described above was tested using a low-carbon steel shaft pinned to the radially inner cylinder 42 of the bushing 22, and mechanically oscillating the shaft and inner cylinder with varying amplitude and frequency. The force transmitted through the magnetorheological (MR) elastomer to the outer cylinder 44 was measured with a load cell. Similar apparatus was also used to measure and determine the stiffness characteristics of the bushing along a radial direction with respect to the bushing, that is, along a direction perpendicular to the longitudinal axis thereof. The longitudinal and radial test results are plotted separately upon the same graph. The axial results were achieved in connection with a peak-to-peak displacement of 0.5 mm, whereas the radial results were achieved in connection with a peak-to-peak displacement of 0.25 mm, and both sets of tests were conducted with a mechanical frequency of 0.5 Hz. Several significant conclusions can be derived from such test results.

It is firstly noted, for example, that the bushing exhibited an axial stiffness value of four hundred forty (440) Newtons/mm when the current applied to the coil 54 was zero. This would then provide the vehicle suspension with a stiffness which would correspond to a typical "soft" bushing. Increasing the axial stiffness can then be provided without stopping the vehicle by accordingly increasing the applied current to the coil 54, allowing immediate evaluation of the vehicles performance with the changed physical properties of the elastomeric device. For example, when the applied current is increased to four Amps, the axial stiffness characteristic of the suspension bushing is increased to approximately seven hundred (700) Newtons/mm, an increase of approximately sixty percent (60%).

Figure 5:
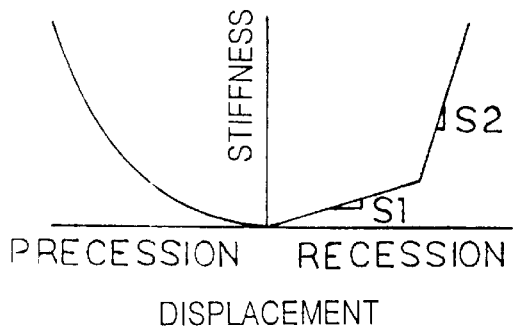
FIG. 5 is a graphical plot illustrating the bushing stiffness as a function of displacement of a transverse suspension member in accordance with the present invention.

It should be noted that a particular suspension bushing may have, for example, the stiffness characteristics illustrated within FIG. 5, while other bushings may be constructed with different stiffness characteristics by changing the geometrical and material parameters of the bushing. For example, altering the axial length or thickness of the bushing elastomer will result in different stiffness and modulus characteristics, thus allowing elastomeric devices to be tailored for evaluating a given physical property. Additionally, altering the material composition of the elastomer will change the stiffness characteristics. For example, the stiffness can be changed by incorporating carbon black particles in place of iron particles in the host material. Accordingly, initial stiffness values different from the graphically illustrated value of four hundred forty (440) Newtons/mm may be achieved as desired.

The parametric controller 26 may consist of a simple, manually adjustable resistive device to provide a parametric state signal ranging from a predetermined low to a predetermined high. For instance, the low signal would correspond to a minimum stiffness for the suspension bushing and the high would correspond to a maximum stiffness. To add elastomeric devices for simultaneous control, additional adjustable resistive devices would be provided. The operator/evaluator would simply tune the various adjustable resistive devices to find the best combination.

The parametric controller 26 may take the form of a control module, including therein a computer system similar to that described regarding the elastomer control module 24. This would enable several enhanced operational capabilities for the present invention, each having its own advantages. For example, the parametric controller 26 could be operated according to a preset evaluation routine, whereby the adjustments are automatically made to correspond to a predetermined point during the evaluation. If the evaluation were performed objectively using measured data, rather than subjectively by an operator, such automation would provide certain, repeatable results in the shortest possible time.

Another example includes the ability to provide a non-linear parametric state signal dependent on some operational characteristic of the vehicle. For instance, as illustrated in FIG. 5, the stiffness of the suspension bushing 22 could be a function of the precession and recession of the transverse suspension member 14. Using conventional displacement sensing devices, as the suspension member 14 undergoes initial recession, the parametric controller would sense this and generate a parametric state signal corresponding to a stiffness represented by the slope S1. At some predetermined amount of recession the parametric controller 26 would generate a parametric state signal corresponding to the slope S2. This transition point is referred to as a knee. The location of this knee, as well as the slopes represented by S1 and S2 are important parameters needed in developing sophisticated elastomeric devices.

Similarly, as the transverse suspension member 14 undergoes precessional movement, unique stiffness relationships may be created by the parametric controller 26 to evaluate any potential elastomeric device contemplated for use by the evaluator.

The parametric controller may also be provided a with a display device 27 for displaying an equivalent physical property signal generated from a lookup table having data corresponding to previously established characteristics of the variable elastomeric device. Alternatively, the parametric controller may determine the equivalent physical property signal by solving a mathematical expression previously fitted to empirical data characterizing the physical properties of the variable elastomeric device.

Various modifications and variations will no doubt occur to those skilled in the art to which this invention pertains. For example, the particular sensors and signals used in conjunction with the disclosed system may be varied from those described herein. These and all other variations which basically rely on the teachings by which this disclosure has advanced the art are properly considered within the scope of this invention as defined by the appended claims.

We claim:

1. A method of rapidly evaluating variations of chassis elastomeric devices used in motor vehicles, the method comprising the steps of:

providing at least one magnetorheological elastomer;

providing a parametric controller to allow a test operator to selectively generate an operator input signal;

providing a display for displaying a signal representative of a physical state of said magnetorheological elastomer;

receiving the operator input signal and generating a parametric state signal therefrom;

communicating the parametric state signal from the parametric controller to an elastomer control module;

generating an electrical current in response to the parametric state signal; and communicating the electrical current to an electrical coil operatively associated with at least one magnetorheological elastomer, thereby generating a magnetic field so as to establish a stiffness of at least one magnetorheological elastomer,;

generating an adjusted operator input signal;

receiving the adjusted operator input signal and generating an adjusted parametric state signal therefrom;

displaying a signal representative of an adjusted physical state of said magnetorheological elastomer;

communicating the adjusted parametric state signal from the parametric controller to the elastomer control module;

generating an adjusted electrical current in response to the adjusted parametric state signal; and communicating the adjusted electrical current to the electrical coil operatively associated with at least one magnetorheological elastomer, thereby generating an adjusted magnetic field so as to adjust the stiffness of at least one magnetorheological elastomer; and evaluating changes in ride, handling, noise, vibration and harshness resulting from the adjusted parametric state signal.

2. A method as set forth in claim 1, wherein the magnetorheological elastomer is fabricated from natural rubber.

* * * * *